(12) United States Patent
Hirsch

(10) Patent No.: US 8,902,934 B2
(45) Date of Patent: Dec. 2, 2014

(54) METHOD AND ARRANGEMENT FOR SYNCHRONISING DATA STREAMS IN NETWORKS AND A CORRESPONDING COMPUTER PROGRAM AND CORRESPONDING COMPUTER-READABLE STORAGE MEDIUM

(75) Inventor: Michael Hirsch, Berlin (DE)

(73) Assignee: Raumfeld GmbH, Berlin (DE)

( * ) Notice: Subject to any disclaimer, the term of this patent is extended or adjusted under 35 U.S.C. 154(b) by 187 days.

(21) Appl. No.: 13/390,864

(22) PCT Filed: Aug. 19, 2010

(86) PCT No.: PCT/EP2010/062085
§ 371 (c)(1),
(2), (4) Date: May 16, 2012

(87) PCT Pub. No.: WO2011/020870
PCT Pub. Date: Feb. 24, 2011

(65) Prior Publication Data
US 2012/0219019 A1    Aug. 30, 2012

(30) Foreign Application Priority Data
Aug. 19, 2009    (DE) .......................... 10 2009 028 645

(51) Int. Cl.
*H04J 3/06*    (2006.01)
*H04L 29/06*    (2006.01)

(52) U.S. Cl.
CPC ........ *H04L 65/4076* (2013.01); *H04L 65/1009* (2013.01); *H04L 69/28* (2013.01)
USPC ........... 370/503; 370/258; 370/389; 370/404; 370/465; 455/436

(58) Field of Classification Search
CPC .................................................. H04J 3/0667
USPC ......... 370/258, 389, 394, 404, 423, 465, 503; 455/436
See application file for complete search history.

(56) References Cited

U.S. PATENT DOCUMENTS

| | | | |
|---|---|---|---|
| 5,220,676 A | 6/1993 | Logalbo et al. | |
| 5,541,360 A * | 7/1996 | Kaneko ........................... | 84/660 |

(Continued)

FOREIGN PATENT DOCUMENTS

| | | |
|---|---|---|
| DE | 694 05 388 T2 | 3/1998 |
| DE | 100 46 920 A1 | 4/2002 |

(Continued)

OTHER PUBLICATIONS

German Office Action date Aug. 2, 2010.

(Continued)

*Primary Examiner* — Andrew Lai
*Assistant Examiner* — Andrew C Lee
(74) *Attorney, Agent, or Firm* — Norris McLaughlin & Marcus, P.A.

(57) ABSTRACT

A method and an arrangement synchronizes data streams in networks, via a corresponding computer program and corresponding computer-readable storage medium which can be used, in particular, for synchronizing different audio playback devices (audio adapters) within a home network. Said home network can be a conventional computer network comprising both wireline and wireless components. According, in order to synchronize the data output in networks in which at least one data stream is transmitted by a network unit to at least two output units of the network, where said stream is outputted, first common time information is made available to at least the output units and the output of the data in the data stream is synchronized at least in terms of the phase and/or frequency on the basis of the first common time information.

19 Claims, 3 Drawing Sheets

(56) References Cited

U.S. PATENT DOCUMENTS

| | | | |
|---|---|---|---|
| 5,764,917 A * | 6/1998 | Royer et al. | 709/231 |
| 6,356,871 B1 * | 3/2002 | Hemkumar et al. | 704/500 |
| 6,526,325 B1 * | 2/2003 | Sussman et al. | 700/94 |
| 6,611,537 B1 * | 8/2003 | Edens et al. | 370/503 |
| 7,206,367 B1 * | 4/2007 | Moore | 375/354 |
| 7,434,078 B2 * | 10/2008 | Swenson et al. | 713/400 |
| 2002/0141452 A1 * | 10/2002 | Mauritz et al. | 370/503 |
| 2004/0075767 A1 * | 4/2004 | Neuman et al. | 348/506 |
| 2004/0187044 A1 * | 9/2004 | Barman et al. | 713/400 |
| 2004/0228367 A1 * | 11/2004 | Mosig | 370/503 |
| 2004/0234000 A1 * | 11/2004 | Page | 375/259 |
| 2005/0053089 A1 | 3/2005 | Abou-Chakra et al. | |
| 2006/0280182 A1 * | 12/2006 | Williams et al. | 370/394 |
| 2007/0025398 A1 | 2/2007 | Yonge, III et al. | |
| 2008/0040759 A1 * | 2/2008 | She et al. | 725/81 |
| 2008/0089363 A1 * | 4/2008 | Paulitsch et al. | 370/503 |
| 2008/0112440 A1 | 5/2008 | Bedekar et al. | |
| 2008/0168470 A1 * | 7/2008 | Bushell et al. | 719/313 |
| 2009/0046593 A1 * | 2/2009 | Ptasinski et al. | 370/252 |
| 2009/0086764 A1 * | 4/2009 | Lee et al. | 370/503 |
| 2009/0204843 A1 * | 8/2009 | Celinski et al. | 713/400 |
| 2009/0298420 A1 * | 12/2009 | Haartsen et al. | 455/3.06 |

FOREIGN PATENT DOCUMENTS

| | | |
|---|---|---|
| DE | 100 57 026 A1 | 5/2002 |
| EP | 0 946 003 A2 | 9/1999 |
| EP | 1 398 931 A1 | 3/2004 |
| WO | 2006/097880 A1 | 9/2006 |

OTHER PUBLICATIONS

International Search Report dated Dec. 9, 2010, mailed Dec. 12, 2010.

* cited by examiner

METHOD AND ARRANGEMENT FOR SYNCHRONISING DATA STREAMS IN NETWORKS AND A CORRESPONDING COMPUTER PROGRAM AND CORRESPONDING COMPUTER-READABLE STORAGE MEDIUM

This application is a 371 application of PCT/EP2010/062085 filed Aug. 19, 2010, which claims foreign priority benefit under 35 U.S.C. §119 of German application 10 2009 028 645.4 filed Aug. 19, 2009.

FIELD OF THE DISCLOSURE

Method and arrangement for synchronising data streams in networks and a corresponding computer program and corresponding computer-readable storage medium The invention relates to a method and an arrangement for synchronising data streams in networks and to a corresponding computer program and corresponding computer-readable storage medium which can be used, in particular, for synchronising different audio playback devices (audio adapters) within a home network. Said home network can be a conventional computer network comprising both wireline and wireless components.

BACKGROUND OF THE DISCLOSURE

An increasing number of devices conforming to the aforesaid standards are available on the market. Support of these standards, however, is not sufficient to implement essential performance features of a "multi-room audio system". These performance features are:
  Synchronous playback of the same audio data or of different channels of the same audio source by different audio adapters.
  Synchronous start of an additional audio adapter during playback.

A trivial approach would be a remote-control start of the autonomous playback station by means of a remote-control signal and as synchronously as possible. This approach, however, results in a signal offset in the range of 200-500 msec. This would not be practical and the corresponding approach is therefore not suitable for the implementation of a multi-room audio system.

The long response time is due to the differently sized pre-buffers of the audio adapters, which are filled in accordance with the audio format used once the playback function is activated but before the playback process starts.

In addition, TCP/IP is a packet-oriented standard, where, in principle, no statements relating to the transfer times between the transmission and processing of information can be made.

Besides the response time problem described above, there is the problem of unsynchronised phases. The playback rate of each audio adapter is, as a rule, dependent on the quartz of the relevant converter chip. The tolerances of each individual quartz result in that the phases of the audio adapters will increasingly differ from each other over time (drift). Both phenomena add up, resulting in a signal offset and unsynchronous playback in the current state of the art.

Existing multi-room audio systems implementing the aforesaid performance features, i.e. synchronous playback or synchronous additional start, are based on proprietary protocols.

As an alternative to TCP, there is the RTP transmission standard (RTP=Real-Time Transport Protocol) for the synchronised playback of media data (video+audio). However, the use of RTP for the implementation of a multi-room audio system has the following drawbacks:
  The resolution of the synchronisation information is too low for audio data.
  RTP is based on UDP. On the internet and also in LAN environments, however, http based on tcp is much more common and must be regarded as a de-facto standard.
  UDP is a "connectionless" transmission standard, which, in contrast to tcp, does not guarantee transmission. This means, data packets may be lost during transmission. This is acceptable provided that the main area of use of RTP is video and not hi-fi audio. In case of video, such an incident ("packet loss") will result in a frame drop, which, in case of doubt, will not be noticed. In case of audio, however, the effect is a clearly audible gap. UDP packet loss is, in particular, a problem in IEEE 802.11 wireless networks.

While time or clock information is partly provided in computer networks, said information is, in particular, transmitted in the data link layer of the OSI layer model (OSI=Open Systems Interconnection). As a consequence, said information depends on the hardware and is not suitable for the purpose of synchronising audio playback devices within a home network. In addition, heterogeneous networks including different transmission technologies (such as Ethernet, Wifi, Bluetooth, Powerline, . . . ) are increasingly used, in particular in the home sector, so that the use of said technology-specific information limits the applicability of the invention.

It is therefore an object of the present invention to provide a method and an arrangement for synchronising data streams in networks and a corresponding computer program and corresponding computer-readable storage medium which avoid the aforesaid drawbacks and, in particular, allow data streams that do not comprise time information to be played back synchronously.

BRIEF SUMMARY OF THE DISCLOSURE

According to the invention, the aforesaid object is achieved by means of the features set out hereinafter.

A particular advantage of the synchronisation method according to the invention is that drift is avoided during playback of at least one data stream, for example an audio data stream, if playback is done by means of several audio playback devices, such as WLAN loudspeakers. Another advantage of the method according to the invention is that synchronisation errors are avoided, which are, for example, caused by accidental network properties, such as so-called network jitter. This is achieved by the fact that in the method for synchronising data output in networks according to the invention, said synchronisation is done on the basis of shared first time information, which is evaluated by at least part of the output units included in the network. The shared first time information can, for example, be absolute time information, a clock signal, which is summed up in the components of the network in order to determine the global time, or relative time information referring to a predefinable global reference or starting point. The invention can be used for at least one data stream which is output by at least two different output units. The at least one data stream can be a data stream or data streams which is/are output by the at least two different output units in a time-related manner or which is/are output such that the time and/or rate at which output is done by the at least two different output units are related to each other or depend on each other. This means, output of the at least one data stream by the at least two different output units is synchronised, at least with regard to phase and/or frequency. The data stream can, for example, be a single data stream which is transmitted by a data source to the at least two output units, such as an MP3 data stream of a piece of music intended for playback in different rooms by the at least two output units. However, the data streams can also be the left and right channels of a stereo audio source or, in general, different data streams whose output is time-dependent on each other in some way. According to the invention, first time information is provided to the at least two output units or to the network, which is a reference clock or a reference time used as a global clock by components of the network, in particular at least part of the playback units of the network. This clock can be installed on a special data processing device. The clock comprises a software module, the so-called wall clock server, and a hardware component, which can be a local clock of the special data processing device, where the wall clock server is installed. The local clock can, for example, be the hardware clock integrated in the data processing device, such as the computer clock, or also a special other hardware clock which is different from the integrated hardware clock. In particular, it is to be noted that the clock need not be the TSF function provided in infrastructure networks conforming to the IEEE 802.11 standard and its amendments, such as IEEE 802.11a/b/g or the like.

According to the invention, data comprising the first shared time information is, for example, transmitted by the data processing device where the wall clock server is installed, through the network layer, transport layer, session layer, presentation layer, application layer of the OSI layer model or a combination of said layers. In this way, synchronisation according to the invention is possible in networks of any kind, if these are IP-only networks. In particular, the invention can also be used in heterogeneous networks, i.e. in networks including both wireless and wireline transmission links, or in ad hoc networks. The present invention is not limited to specific hardware or communication standards, such as the IEEE 802.11 standard and its amendments, such as IEEE 802.11a/b/g or the like.

According to the invention, the time information provided to the network by the wall clock server is now used by the at least two output units to synchronise output of the at least one data stream. Here, it is advantageous if the first time information provided by the wall clock server is compared to at least one piece of second time information that is used locally in the network components, in particular in the at least two output units. This second time information is preferably provided by the hardware clocks integrated in each of the network components. Said comparison can, in particular, comprise the comparison of the duration of a time unit, for example a cycle length, of the first time information with the duration of a time unit of the second time information. In the ideal case, said durations (cycle lengths) are identical, which would mean that the passage of time (or clock frequency) in the wall clock server is exactly the same as the passage of time in the individual network components, which would ensure the same output rate on all network components. In the normal case, however, said durations are not identical, so that the second time information used for output must be corrected.

For this reason, in a preferred embodiment of the method according to the invention, the interval between arrival of a first time signal of the shared first time information sent by the wall clock server and a second time signal of the shared first time information sent by the wall clock server is measured by a software module installed on the network components, the so-called audio renderer, and said interval is expressed in units of the local clock of the network component. The first and second signals, $tw_1$ and $tw_2$, which are provided by the wall clock server, indicate the time that has passed on the wall clock server, while the difference ($tc_2-tc_1$) between the arrival times of the two signals, expressed by values of the local clock of the network component, indicates the time that has passed on the local network component between the arrival of the two time signals of the wall clock server. The comparison of these two intervals serves to determine the different passage of time in the wall clock server and in the local network component and to correct the local passage of time on the network component, thus adapting it to the passage of time of the wall clock server. If absolute time information is used, the time of the wall clock server can be approximated on the network component at any time. Advantageous embodiments of said approximation are described in more detail below.

If the difference in the passage of time on the wall clock server and on the individual local network components is known, output of the at least one data stream by at least two output units can now be synchronised with regard to the start of output and/or the output rate. To enable output of an audio stream to be started simultaneously on several output units, a wall clock time is transmitted to these output units as a start time. Approximation of said start time in the output units ensures that output of the audio stream actually starts at the same time on all output units involved.

In a preferred embodiment, the output rate of the data streams is synchronised by determining an actual value and a desired value for the current sample position (AS) of an audio output unit, e.g. an ND converter. If the actual value differs from the desired value of the sample position, this difference can, for example, be compensated for by means of a resampling algorithm, for example by adding or omitting individual samples. If an output unit is provided with a hardware clock whose clock frequency can be controlled, the difference of the actual position from the desired position can also be corrected by adapting the clock frequency of the local hardware clock to the clock frequency of the wall clock server.

In another embodiment of the present invention, inaccuracies during data transmission in the network, for example a variance in transfer time of data packets between network components (network jitter), are taken into account during synchronisation.

In a preferred embodiment of the invention, effects caused by network jitter are taken into account by determining the transfer time of the data packets between the data source and the output unit, for example by transmitting a data packet from the output unit to the wall clock server and from the wall clock server back to the output unit. Evaluation of the transmission time and reception time of the data packet on the output unit enables the duration of data transmission/return between the output unit and the wall clock server to be determined, thus enabling determination of the duration of data transmission from the data source to the output unit. If said duration of transmission is known, it can be used to compensate for the effects caused by network jitter. In addition, it is advantageous that parameters affecting network jitter be eliminated by means of filter algorithms.

An arrangement according to the invention comprises at least one chip and/or processor and is configured in such a manner that a method for synchronising data output in networks comprising at least two output units can be carried out, wherein shared first time information is at least provided to the at least two output units and the data streams are synchronised by outputting them on the basis of the shared first time information.

A computer program for synchronising data output in networks comprising at least two output units enables a data processing device to carry out a synchronisation method, once it is loaded into memory of the data processing device, wherein shared first time information is at least provided to the at least two output units and the data streams are synchronised by outputting them on the basis of the shared first time information.

In another preferred embodiment of the invention, the computer program according to the invention has a modular structure, wherein individual modules are installed on different data processing devices.

In addition, advantageous embodiments include computer programs which serve to carry out additional method steps or method sequences set out in the description.

Such computer programs can, for example, be provided for download (for a fee or free of charge, freely accessible or password-protected) in a data or communication network. The computer programs provided in this way can then be made available for use by means of a method where a computer program according to claim 18 is downloaded from an electronic data network, such as the internet, to a data processing device connected to the data network.

To carry out the method according to the invention for synchronising data output in networks comprising at least two output units, a computer-readable storage medium is used where a program is stored which enables a data processing device to carry out a synchronisation method, once it is loaded into memory of the data processing device, wherein shared first time information is at least provided to the at least two output units and the data streams are synchronised by outputting them on the basis of the shared first time information.

This means, the invention uses two software modules which are used on different hardware devices within the LAN:
  the wall clock server and
  the audio renderer.

The wall clock server software module can be started on any hardware device. There is only one wall clock server within a network in each case. The audio renderer is the software of a network component, such as an audio adapter; this means, there can be several audio renderers within the network.

The audio renderer is preferably installed on all network components that are suitable for outputting data streams.

I. Establishing a Shared Clock on all Devices

To provide the first time information to the other network components, the wall clock server software module periodically transmits at least one data packet to the audio renderer software module in a preferred embodiment. In a preferred embodiment, said data packet includes:
  time information tw obtained from the local clock of the underlying hardware where the wall clock server is installed (as a rule the computer clock),
  the definition of the time interval of the data packets,
  a packet serial number.

The software modules (clients) that have been received and installed on at least part of the network components determine the time of reception (tc) for each data packet on the basis of the integrated hardware clock.

The continuous difference of the two clocks can be described as a quotient (QF) as of the second data packet:

$$QF=(tw_n-tw_0)/(tc_n-tc_0)$$

The time of the wall clock server, twa, can now be approximated on the clients at any time, tci:

$$twa=tw_0+QF*(tc_i-tc_0)$$

However, twa is not the same as tw since the measuring points $tc_0$–$tc_n$ are inaccurate due to the unknown duration of packet transmission (network jitter).

Said duration is approximated by transmitting a data packet including the local time from the clients to the wall clock server. Said data packet is returned to the client by the wall clock server. The reception time and the transmission time are compared, thus obtaining the duration of two transmissions which can be used to calculate the duration of packet transmission for one transmission link.

However, network jitter is not constant; suitable filter algorithms are therefore used to eliminate the incorrect parameters (LMS, Kalman filter, low-pass).

To be precise, a precondition for the above calculations is that $$(tw_{i+1}-tw_i)=(tc_{i+1}-tc_i);$$

this means, that a time cycle $tw_{i+1}$–$tw_i$ on the wall clock server should have the same length as a time cycle $tc_{i+1}$–$tc_i$ of the local clock on the individual network components. This is ensured by most hardware standards or is otherwise easy to achieve by introducing a proportionality factor.

II. Measurement of the Sample Rate of the Sound Card (ND Converter) of the Audio Adapter Relative to the Wall Clock Once twa is known, the sound card is started at any time ($tw_{start}$). The current sample position (AS) of the sound card is continuously scanned, thus obtaining a difference in samples (DS) from the actual position to the desired position in an easy way:

$$DS=(twa-tw_{start})*\text{sampling frequency}-AS$$

III. Continuous Compensation for the Difference

DS can now be compensated for by means of a resampling algorithm after each scan.

If the underlying audio hardware should be provided with a software-controllable quartz, the playback rate can be adapted as an alternative.

DS includes both the phase difference and the frequency difference (offset and drift). To avoid high variations, both values are compensated separately.

IV. Audio Data Transmission/Streaming

To ensure that output of a data stream is started at the same time on different output units, the same, future wall clock server time is transmitted as a start time ($tw_{stream}$) for the audio data stream to all audio renderers which are intended for joint playback of the data stream, for example an audio stream, or synchronous playback of different channels of an audio source.

The audio renderer calculates the sample position (SP) of the first sample of the audio data stream in the running system by means of:

$$SP=(tw_{stream}-tw_{start})*\text{sampling frequency}$$

A particular advantage of the invention is that the method according to the invention allows synchronisation information, such as time information, to be separated from the actually useful data, such as audio, video or multimedia data. This makes particular sense if audio data from different sources (e.g. internet streaming services, internet radio, local music collection, live input) is played back at the same time or alternately.

As a result, the method according to the invention does not adjust a clock but, independently thereof, an audio data stream. The time of the wall clock server is determined on the output units and the output time and the output rate are controlled on the basis of the wall clock server time that has been determined. So to speak, a virtual clock indicating the time of the wall clock server is used on the output units for output of the data streams. This means, the data streams are output in accordance with the time of the wall clock server that is determined in the output units without affecting the passage of time on the local clocks of the output units; in particular, said clocks are not synchronised, but function independently of the clock of the wall clock server, i.e. independently of the shared first time information. This has the particular advantage that the invention avoids problems relating to the adjustment of clocks on the output units.

In particular, the invention allows to synchronise multiple devices with different signal transmission times.

BRIEF DESCRIPTION OF THE DRAWINGS

The invention will now be explained in more detail with reference to the figures shown in the drawings and by means of various exemplary embodiments. In the figures.

DETAILED DESCRIPTION OF THE DISCLOSURE

While the invention is hereinafter explained taking specific networks and protocols as an example, the invention is not limited to these specific examples but includes networks, protocols or data formats of any kind, provided that the features set out in the independent claims are implemented.

Figure 1:
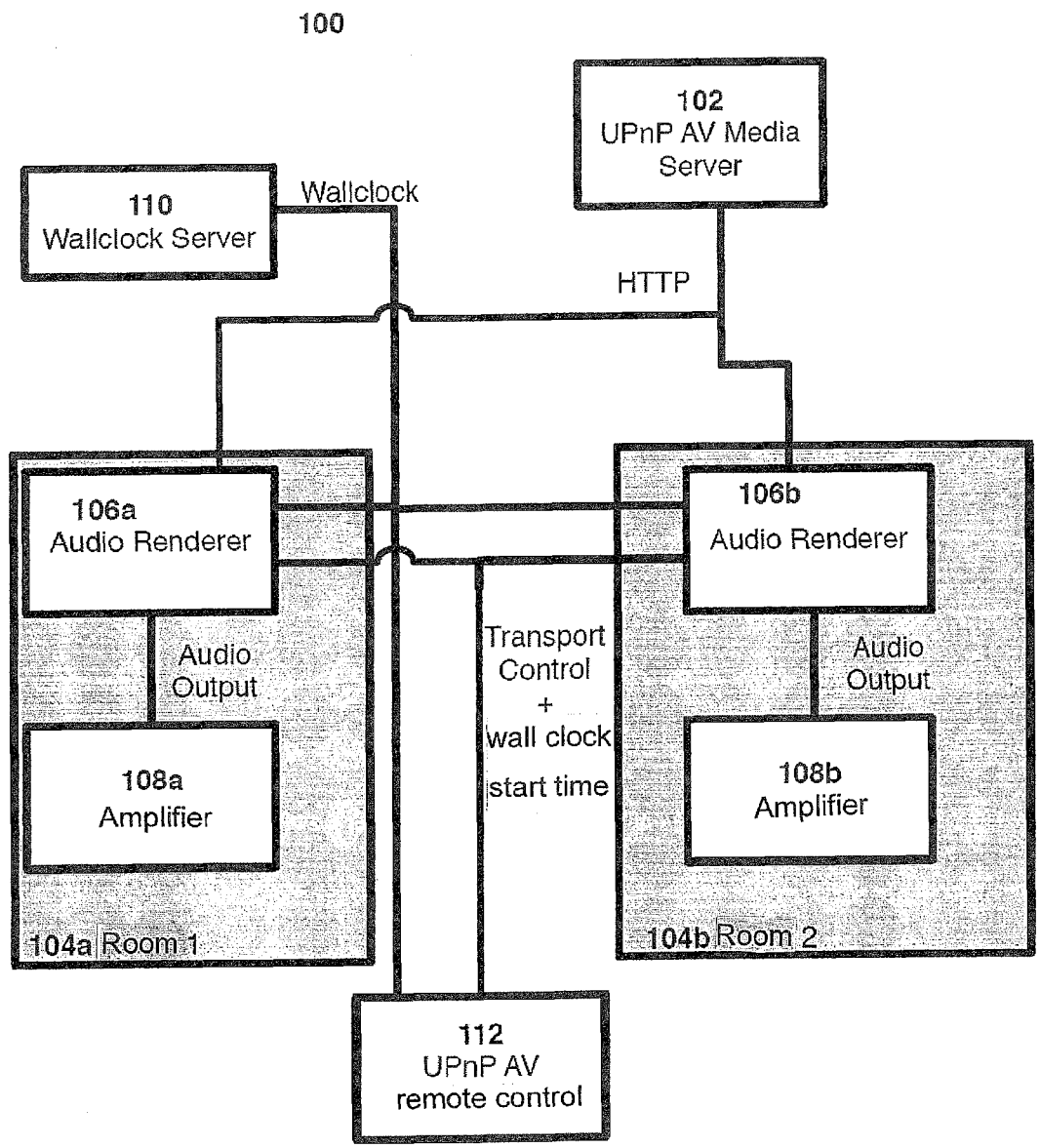
FIG. 1: shows an illustration of the synchronisation of output in a UpnP-compatible LAN (UPnP=Universal Plug and Play)

FIG. 1 shows a UPnP-compatible LAN 100. In this exemplary embodiment, it comprises a UPnP-AV-compatible media server 102, where, for example, audio data is played back using TCP/http and transmitted to two loudspeakers 104a, 104b which serve as output units and can, for example, be placed in different rooms. Transmission is, for example, done using the http protocol. In this exemplary embodiment, each loudspeaker 104a, 104b comprises a UPnP-AV audio renderer 106a, 106b and an amplifier 108a, 108b.

In addition, the UPnP-compatible LAN 100 comprises a wall clock server 110 which provides the shared first, global time information provided to at least part of the other components of the UpnP-compatible LAN 100, in particular to the UPnP-AV audio renderers 106a, 106b and a UPnP-AV-compatible remote control 112. Preferably, absolute global time information is provided. This has the advantage that times of events, such as for start of output, can be indicated as a single time value that e.g. directly defines the start time. As an alternative, other approaches using relative time information are possible, where, for example, any (absolute) time is used as a reference value to which other relative time information refers. A predefined reference value can, for example, be any absolute global time value of the wall clock server 110, which is assigned a local absolute time value of the local hardware clocks as a local reference time value in each case during synchronisation. The relative global time information always refers to these global reference time values in this case. In such an exemplary embodiment, the relative global time information must then be used to calculate the local absolute time values.

The time information can, for example, be the start time $tw_{start}$ for the output of audio data. To start output, a UPnP-AV transport command and a wall clock start time $tw_{stream}$ are transmitted to the UPnP-AV audio renderers 106a, 106b by means of the UPnP-AV-compatible remote control 112 in this case. In a preferred embodiment, the UPnP-AV transport command is transmitted together with the wall clock start time $tw_{stream}$.

The UPnP-AV audio renderers 106a, 106b have been synchronised using the method according to the invention and, as a result, know the differences $QF_a$ and $QF_b$ of their local hardware clock from the wall clock of the wall clock server 110 and, in each case, the local time $tc_{start,a/b}$ corresponding to the wall clock start time $tw_{start}$.

The UPnP-AV audio renderers 106a and 106b start the audio hardware at the times $tc_{start,a}$ and $tc_{start,b}$ corresponding to the wall clock start time $tw_{start}$. As a rule, no audio data is output at the time $tw_{start}$ but 0 values are played back and the data streams are synchronised according to the invention. If now a network component (e.g. the remote control) transmits user input to play back an audio data stream, a UPnP transport command, the source address (URI) and a future start time $tw_{stream}$ corresponding to the wall clock time domain are transmitted. The data streams are read from the source address according to the protocol defined in the URI (e.g. http, mms, rstp), decoded if required and held in a local memory (preloading). As a rule, not the entire data stream but only the beginning (e.g. 4 seconds) is preloaded. The start time $tw_{stream}$ can be converted into a local sample position and included in the transferred data stream as of this time.

In an exemplary embodiment, the data stream is synchronised by means of a resampling algorithm in each case.

As an alternative to synchronisation by means of resampling algorithms, the sample rate can be adapted by adapting the frequency of the quartz of the UPnP-AV audio renderers 106a and 106b to the frequency of the wall clock. Once the audio data of the audio stream is converted into analogue signals by means of a D/A converter, it is supplied to the amplifiers 108a, 108b and finally output through the loudspeakers 104a, 104b.

Figure 2:
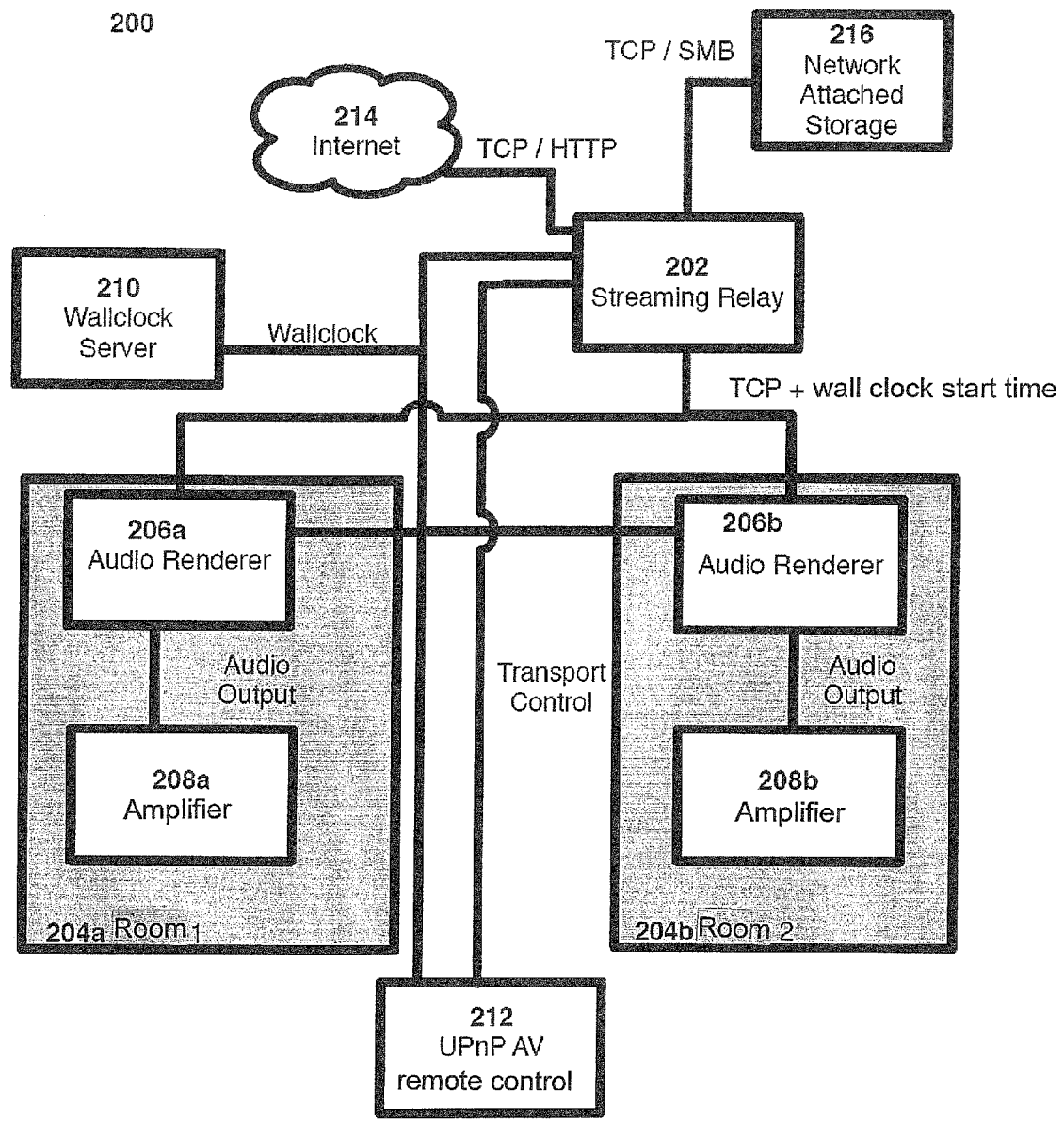
FIG. 2: shows an illustration of the synchronisation of different local and internet-based audio data streams using TCP.

Referring to FIG. 2, a second exemplary embodiment is provided to explain synchronisation of different local and internet-based audio data streams using TCP. The UPnP-compatible LAN 200 of the second exemplary embodiment comprises a so-called streaming relay 202, in addition to the other components, i.e. wall clock server 210, UPnP-AV-compatible remote control 212 and loudspeakers 204a, 204b with UPnP-AV audio renderers 206a, 206b and amplifiers 208a, 208b. The streaming relay 202 is a central software module which redirects all data streams that are received in the LAN 200. The streaming relay 202 can, in principle, be installed on its own hardware component included in the UPnP-compatible LAN 200 or in one of the existing hardware components (e.g. a media server) of the UPnP-compatible LAN 200. Said data streams, such as audio, video or multimedia data streams, can be provided by a source on the internet 214 or by a network-attached storage 216. Transmission from the internet 214 to the streaming relay 202 can, for example, be done using the TCP/http protocol, while the TCP/SMB protocol (SMB=Server Massage Block) can, for example, be used for transmission from the network-attached storage 216 to the streaming relay 202.

The streaming relay 202 ensures that all audio adapters, such as the loudspeakers 204a, 204b, start with the same data packet in case of continuous data streams. The streaming relay 202 is also able to determine the valid sample positions at the start of a frame in accordance with the audio data format. The streaming relay 202 takes on the task of the remote control of FIG. 1; it transmits a starting position ($tw_{stream}$), a UPnP transport command and a source address (URI) provided by the streaming relay to the audio adapters. The streaming relay can also be remote-controlled by means of a UPnP transport command (e.g. from the remote control 112) which receives user input.

Figure 3:
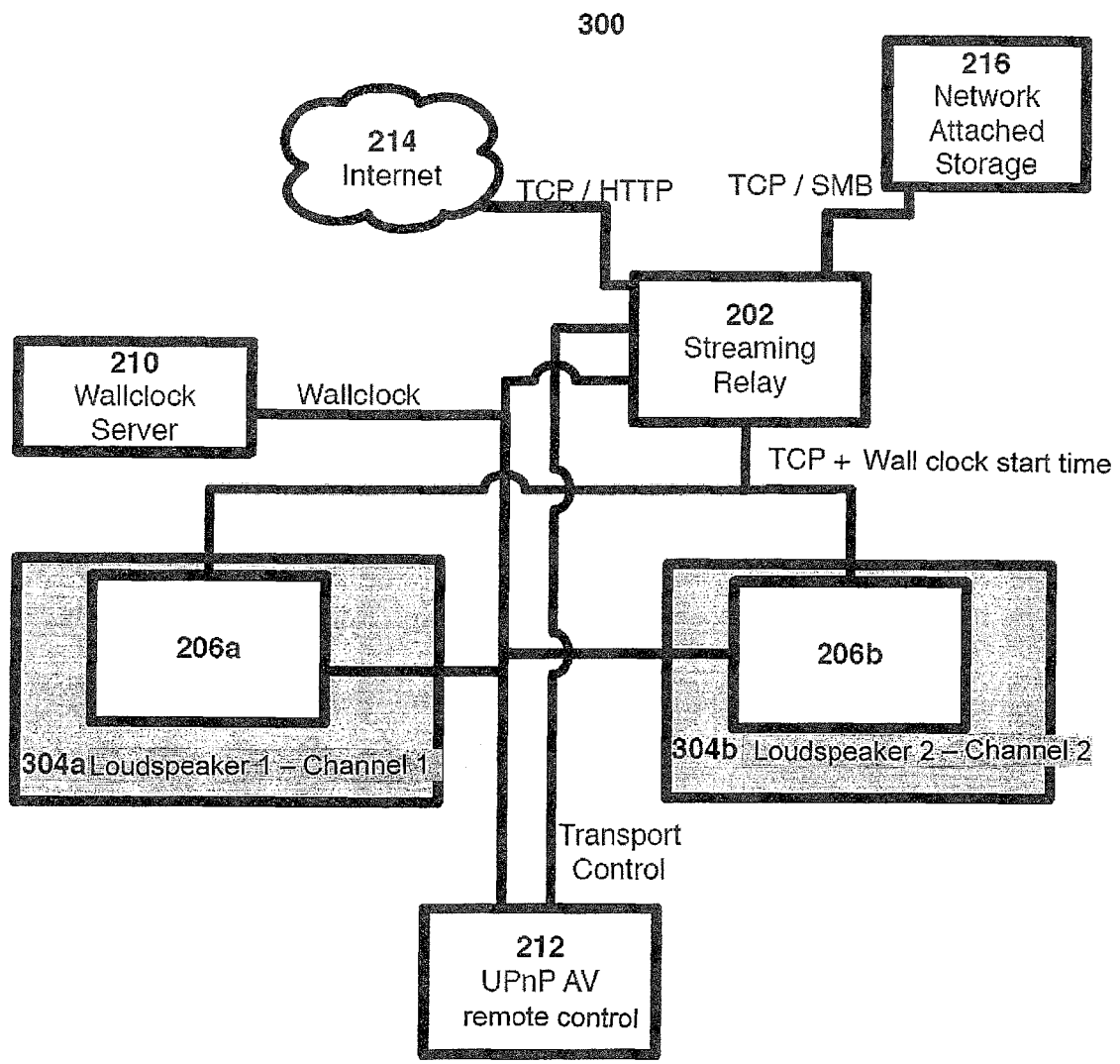
FIG. 3: shows an illustration of the synchronisation of different loudspeakers.

Instead of different loudspeakers 204a, 204b in different rooms, different channels of an audio data stream can be concerned, which are output by individual active loudspeakers 304a and 304b. This situation is shown in FIG. 3.

The embodiment of the invention is not limited to the preferred exemplary embodiments discussed above. Rather, numerous variants are possible, which use the method according to the invention and the arrangement according to the invention and the computer program according to the invention and the computer-readable storage medium according to the invention, even if they are fundamentally different from the embodiments described above.

LIST OF REFERENCE NUMERALS

100 UpnP-compatible LAN
102 UPnP-AV-compatible media server
104a Loudspeaker
104b Loudspeaker
106a UPnP-AV audio renderer
106b UPnP-AV audio renderer
108a Amplifier
108b Amplifier
110 Wall clock server
112 UPnP-AV-compatible remote control
200 UpnP-compatible LAN
202 Streaming relay
204a Loudspeaker
204b Loudspeaker
206a UpnP-AV audio renderer
206b UPnP-AV audio renderer
208a Amplifier
208b Amplifier
210 Wall clock server
212 UPnP-AV-compatible remote control
214 Internet
216 Network-attached storage
304a Active loudspeaker
304b Active loudspeaker

The invention claimed is:

1. A method for synchronising data output in networks, wherein at least one data stream is transmitted by a network unit to at least two output units of the network and is output by at least part of the output units, the method comprising:
providing periodically, by a global clock, first information about a global time at least to the at least two output units,
approximating, on the at least two output units, the global time by evaluating:
of the first information about the global time and of second information about a local time, the second information about the local time is provided by a local clock of each of the at least two output units, and wherein the second information about the local time is the instant of time that the first information about the global time was received by the respective at least two output units,
of a length of time cycles of the global clock and the local clock, and
of a duration of transmission of the first information about the global time from the global clock to the at least two output units, wherein the duration of transmission is determined by taking into account a variance in transfer time between the global clock and the at least two output units, and
synchronising output of the data stream, at least with regard to phase and frequency, on the basis of the approximated global time information and independently of the information about the local time provided, by the local clocks of the at least two output units.

2. The method according to claim 1, wherein output of the data stream is synchronised, wherein the local clocks of the output units function independently of the first information about the global time.

3. The method according to claim 1, wherein the first information about the global time is provided by transmitting data comprising the first information about the global time through at least one of a network layer, a transport layer, a session layer, a presentation layer, and an application layer of the OSI layer model or a combination of the network, transport, session, presentation and application layers.

4. The method according to claim 1, wherein the first information about the global time is an absolute time information or a relative time information, referring to a predefinable global reference or starting point.

5. The method according to claim 1, wherein output of the data stream is synchronised by compensating for a difference between the first information about the global time and the at least one piece of the second information about the local time.

6. The method according to claim 1, wherein the start of output of the data is synchronised.

7. The method according to claim 1, wherein the output rate of the data is synchronised.

8. The method according to claim 1, wherein the duration of data transmission is determined by transmitting data from at least one of the output units to a unit providing the first information about the global time and returning said data to the at least one output unit and determining the time between transmission and reception of the data in the at least one output unit.

9. The method according to claim 1, wherein synchronisation comprises a determination of a number of samples corresponding to the difference between the first information about the global time and the at least one piece of the second information about the local time.

10. The method according to claim 1, wherein synchronisation comprises an adaptation of a clock frequency of at least one of the local clocks used in the at least two output units and/or a resampling of at least part of the data streams.

11. The method according to claim 1, wherein the data stream is outputted in accordance with the global time, without synchronizing the local clocks.

12. The method according to claim 1, wherein the data stream does not comprise time information.

13. The method according to claim 1, wherein the local clock is a hardware clock.

14. A system for synchronising data output has at least one network unit and at least two output units, wherein the system is configured such that at least one data stream is transmittable by the network unit to the at least two output units, and at least a portion of the at least one data stream is outputtable by at least part of the at least two output units, wherein the system further comprising:
a computer program for synchronising data output that executes a method comprising:
providing periodically, by a global clock, first information about a global time at least to the at least two output units, approximating, on the at least two output units, the global time by evaluating:
- of the first global time information about the global time and of second information about a local time, the second information about the local time is provided by a local clock of each of the at least two output units, and wherein the second information about the local time is the instant of time that the first information about the global time was received by the respective at least two output units,
- of a length of time cycles of the global clock and the local clock, and
- of a duration of transmission of the first information about the global time from the global clock to the at least two output units, wherein the duration of transmission is determined by taking into account a variance in transfer time between the global clock and the at least two output units, and synchronizing output of the data stream, at least with regard to phase and frequency, on the basis of the approximated global time information and independently of the information about the local time provided by the local clocks.

15. The system according to claim 14, wherein the system is part of a multi-room audio system.

16. The system according to claim 14, wherein data transmission between the at least one network unit and the at least two output units is at least partly wireless.

17. The system according to claim 14, wherein the at least two output units comprise one or more devices selected from an audio playback device, a video playback device, a multimedia playback device and a combination thereof.

18. The system according to claim 14, wherein the system further comprises a network including at least partly wireless communication links.

19. A non-transitory computer-readable storage medium storing a computer program, wherein the computer program enables a data processing device to carry out a method for synchronising data streams in networks once the computer program is loaded into a storage of the data processing device, wherein at least one data stream is transmitted by a network unit to at least two output units of the network and is output by at least part of the at least two output units, wherein the method comprises:
providing periodically first information about a global time to the at least two output units,
approximating, on the at least two output units, the global time by evaluating:
- of the first information about the global time and of second information about a local time, the second information about the local time is provided by a local clock of each of the at least two output units, and wherein the second information about the local time is the instant of time that the first information about the global time was received by the respective at least two output units,
- of a length of time cycles of the global clock and the local clock, and
- of a duration of transmission of the first information about the global time from the global clock to the at least two output units, wherein the duration of transmission is determined by taking into account a variance in transfer time between the global clock and the at least two output units, and synchronising output of the data stream, at least with regard to phase and frequency, on the basis of the approximated global time information and independently of the second information about the local time provided by the local clocks.

* * * * *